United States Patent
Lim et al.

(10) Patent No.: US 6,463,451 B2
(45) Date of Patent: Oct. 8, 2002

(54) HIGH SPEED DIGITAL SIGNAL PROCESSOR

(75) Inventors: Il Taek Lim, Seoul (KR); Kyu Seok Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/902,603

(22) Filed: Jul. 12, 2001

(65) Prior Publication Data

US 2001/0039557 A1 Nov. 8, 2001

Related U.S. Application Data

(63) Continuation of application No. 09/144,284, filed on Aug. 31, 1998, now Pat. No. 6,317,770.

(30) Foreign Application Priority Data

Aug. 30, 1997 (KR) .............................................. 97-45344
Apr. 2, 1998 (KR) .............................................. 98-11642

(51) Int. Cl.[7] ................................................ G06F 7/48
(52) U.S. Cl. .......................... 708/523; 708/404; 708/524
(58) Field of Search ................................ 708/523, 524, 708/501, 490, 404

(56) References Cited

U.S. PATENT DOCUMENTS

| | | | |
|---|---|---|---|
| 4,811,267 A | 3/1989 | Ando et al. | 708/490 |
| 5,175,702 A | 12/1992 | Beraud et al. | 364/736 |
| 5,179,531 A | 1/1993 | Yamaki | 708/490 |
| 5,260,897 A | 11/1993 | Toriumi et al. | 364/736 |
| 5,301,137 A * | 4/1994 | Matsuo et al. | 708/501 |
| 5,442,580 A | 8/1995 | Fettweis | 364/736 |
| 5,522,085 A * | 5/1996 | Harrison et al. | 708/523 |
| 5,941,940 A | 8/1999 | Prasad et al. | 708/523 |
| 5,987,490 A * | 11/1999 | Alidina et al. | 708/523 |
| 6,014,683 A | 1/2000 | Katsuta | 708/490 |
| 6,138,136 A * | 10/2000 | Bauer et al. | 708/501 |

* cited by examiner

*Primary Examiner*—David H. Malzahn
(74) *Attorney, Agent, or Firm*—Fleshner & Kim, LLP

(57) ABSTRACT

A digital signal processor being capable of rapidly operating a number of complex arithmetic formulae as such FFT. The digital signal processor operates data from first input line and data from second input line by a multiplier; operating data from any one of the first and second input lines and data from the first operating means by means of second operating means; and operating the data from any one of the first and second input lines and the data from the first operating means by means of third operating means. The data output from the multiplier is operates with any one from the first and second input lines by first accumulator. Also, the data output from the multiplier is operates with any one from the first and second input lines by second accumulator.

22 Claims, 12 Drawing Sheets

FIG. 8(a)

TABLE 1

| | | | | | |
|---|---|---|---|---|---|
| 1 | | | | | d=X[a] |
| 2 | | | | m=cos q | t=X[b] |
| 3 | | | p=m*t | m=sin q | t=[b] |
| 4 | | X0=d+p, X1=d-p | p=m*t | m=cos q | | d=[a] |
| 5 | | X0=X0-p, X1=X1+p | p=m*t | m=sin q | t=X[b] |
| 6 | X'[a]=X0 | X2=d-p, X3=d+p | p=m*t | | |
| 7 | X'[b]=X1 | X2=X2-p, X3=X3+p | | | |
| 8 | Y'[b]=X2 | | | | |
| 9 | Y'[a]=X3 | | | | |

FIG. 8(b)

TABLE 2

*a1 : X[a], a2:X[b], a3:Y[a], a4:Y[b]

| | | | | | | | |
|---|---|---|---|---|---|---|---|
| 1 | | | | | d=dram[a1] | | |
| 2 | | | | m=crom[cosptr] | t=dram[a2] | | |
| 3 | | | p=m*t | m=crom[sinptr] | t=dram[a4] | | |
| 4 | | X0=d+p, X1=d-p | p=m*t | m=crom[cosptr] | d=dram[a3] | | |
| 5 | | X0=X0-p, X1=X1+p | p=m*t | m=crom[sinptr] | t=dram[a2] | a=a1 | a1++ |
| 6 | dram[a]=X0 | X2=d-p, X3=d+p | p=m*t | | | a=a2 | a2++ |
| 7 | dram[a]=X1 | X2=X2-p, X3=X3+p | | | | a=a4 | a4++ |
| 8 | dram[a]=X2 | | | | | a=a3 | a3++ |
| 9 | dram[a]=X2 | | | | | | |

*dram→data RAM  *a1++→a1=a1+1
*crom→Coef ROM

FIG. 8(c)

TABLE 3

*a1 : X[a], a2 : X[b], a3 : Y[a], a4 : Y[b]

| # | | | | | | |
|---|---|---|---|---|---|---|
| 1 | | | | | d=dram[a1] | |
| 2 | | | | m=crom[cosptr] | t=dram[a2] | |
| 3 | | | p=m*t | m=crom[sinptr] | t=dram[a4] | |
| 4 | | X0=d+p, X1=d−p | p=m*t | m=crom[cosptr] | | d=dram[a3] |
| 5 | | X0=X0−p, X1=X1+p | p=m*t | m=crom[sinptr] | t=dram[a2] | a=a1 a1++ |
| 6 | dram[a]=X0 | X2=d−p, X3=d+p | p=m*t | | d=dram[a1] | a=a2 a2++ |
| 7 | dram[a]=X1 | X2=X2−p, X3=X3+p | | m=crom[cosptr] | t=dram[a2] | a=a4 a4++ |
| 8 | dram[a]=X2 | | p=m*t | m=crom[sinptr] | t=dram[a4] | a=a3 a3++ |
| 9 | dram[a]=X3 | X0=d+p, X1=d−p | p=m*t | m=crom[cosptr] | | d=dram[a3] |
| 10 | | X0=X0−p, X1=X1+p | p=m*t | m=crom[sinptr] | t=dram[a2] | |
| 11 | dram[a]=X0 | X2=d−p, X3=d+p | p=m*t | cosptr++ | | a=a1 a1+=a0 |
| 12 | dram[a]=X1 | X2=X2−p, X3=X3+p | | sinptr++ | | a=a2 a2+=a0 |
| 13 | dram[a]=X2 | | | | | a=a4 a4+=a0 |
| 14 | dram[a]=X3 | | | | | a=a3 a3+=a0 |

Loop: rows 5–13

*dram → data RAM   *a1++ → a1=a1+1
*crom → Coef ROM   *a1+=a0 → a1=a1+a0

FIG. 8(d)

TABLE 4

* q=0

| 실행수학식<br>(behavior) | $X'[a]=X[a]+X[b]$<br>$Y'[a]=Y[a]+X[b]$<br>$X'[b]=X[a]-X[b]$<br>$Y'[b]=Y[a]-X[b]$ |
|---|---|

| 1 | | | d=X[a] |
|---|---|---|---|
| 2 | | X0=d, X1=d | d=X[b] |
| 3 | | X0=X0-d, X1=X1+d | d=Y[a] |
| 4 | X[a]=X0 | X2=d, X3=d | d=Y[b] |
| 5 | X[b]=X1 | X2=X2+d, X3=X3-d | |
| 6 | Y[a]=X2 | | |
| 7 | Y[b]=X3 | | |

FIG. 8(e)

TABLE 5

*q=0, a1 : X[a], a2 : X[b], a3 : Y[a], a4 : Y[b]

| 1 | | | | d=dram[a1] | |
|---|---|---|---|---|---|
| 2 | | | X0=d, X1=d | d=dram[a2] | |
| 3 | | a=a1 | X0=X0-d, X1=X1+d | d=dram[a3] | a1++ |
| 4 | X[a]=X0 | a=a2 | X2=d, X3=d | d=dram[a4] | a2++ |
| 5 | X[b]=X1 | a=a3 | X2=X2+d, X3=X3-d | | a3++ |
| 6 | Y[a]=X3 | a=a4 | | | a4++ |
| 7 | Y[b]=X2 | | | | |

*dram→data RAM  *a1++→a1=a1+1
*crom→Coef ROM

FIG. 8(f)

TABLE 6

*q=0, a1 : X[a], a2 : X[b], a3 : Y[a], a4 : Y[b]

| | dram[a]= | a= | | | d=dram[] | |
|---|---|---|---|---|---|---|
| 1 | | | | | d=dram[a1] | |
| 2 | | | X0=d, X1=d | | d=dram[a2] | |
| 3/4 | | a=a1 | X0=X0−d, X1=X1+d | | d=dram[a3] | 3:a1++/4:a1+=a0 |
| 5 | dram[a]=X0 | a=a2 | X2=d, X3=d | | d=dram[a4] | a2++ |
| 6 | dram[a]=X1 | a=a3 | X2=X2−d, X3=X3+d | | d=dram[a1] | a3++ |
| 7 | dram[a]=X3 | a=a4 | X0=d, X1=d | | d=dram[a2] | a4++ |
| 8/9 | dram[a]=X2 | a=a1 | X0=X0−d, X1=X1+d | | d=dram[a3] | 8:a1++/9:a1+=a0 |
| 10 | dram[a]=X0 | a=a2 | X2=d, X3=d | | d=dram[a4] | a2+=a0 |
| 11 | dram[a]=X1 | a=a3 | X2=X2−d, X3=X3+d | | | a3+=a0 |
| 12 | dram[a]=X3 | a=a4 | | | | a4+=a0 |
| 13 | dram[a]=X2 | | | | | |

Loop: rows 5–12

*dram→data RAM   *a1++→a1=a1+1
*crom→Coef ROM   *a1+=a0→a1=a1+a0

FIG. 8(g)

TABLE 7

| 1 |         |                  | d=X[a] |
|---|---------|------------------|--------|
| 2 |         | X0=d, X1=d       | d=Y[b] |
| 3 |         | X0=X0-d, X1=X1+d | d=Y[a] |
| 4 | X[a]=X0 | X2=d, X3=d       | d=X[b] |
| 5 | X[b]=X1 | X2=X2-d, X3=X3+d |        |
| 6 | Y[b]=X2 |                  |        |
| 7 | Y[a]=X3 |                  |        |

FIG. 8(h)

TABLE 8

*q=Π/2, a1 : X[a], a2 : X[b], a3 : Y[a], a4 : Y[b]

| 1 |            |      |                  | d=dram[a1] |      |
|---|------------|------|------------------|------------|------|
| 2 |            |      | X0=d, X1=d       | d=dram[a4] |      |
| 3 |            | a=a1 | X0=X0-d, X1=X1+d | d=dram[a3] | a1++ |
| 4 | dram[a]=X0 | a=a2 | X2=d, X3=d       | d=dram[a2] | a2++ |
| 5 | dram[a]=X1 | a=a4 | X2=X2-d, X3=X3+d |            | a4++ |
| 6 | dram[a]=X2 | a=a3 |                  |            | a3++ |
| 7 | dram[a]=X3 |      |                  |            |      |

TABLE 9

*q=π/2, a1 : X[a], a2 : X[b], a3 : Y[a], a4 : Y[b]

|   |   |   |   |   |
|---|---|---|---|---|
| 1 |   |   |   | d=dram[a1] |
| 2 |   |   | X0=d, X1=d | d=dram[a4] |
| 3/4 |   | a=a1 | X0=X0−d, X1=X1+d | d=dram[a3] 3:a1++/4:a1+=a0 |
| 5 | dram[a]=X0 | a=a2 | X2=d, X3=d | d=dram[a2] a2++ |
| 6 | dram[a]=X1 | a=a4 | X2=X2−d, X3=X3+d | d=dram[a1] a4++ |
| 7 | dram[a]=X2 | a=a3 | X0=d, X1=d | d=dram[a4] a3++ |
| 8/9 | dram[a]=X3 | a=a1 | X0=X0−d, X1=X1+d | d=dram[a3] 8:a1++/9:a1+=a0 |
| 10 | dram[a]=X0 | a=a2 | X2=d, X3=d | d=dram[a2] a2+=a0 |
| 11 | dram[a]=X1 | a=a4 | X2=X2−d, X3=X3+d |  a4+=a0 |
| 12 | dram[a]=X2 | a=a3 |   |  a3+=a0 |
| 13 | dram[a]=X3 |   |   |   |

Loop

*dram→data RAM    *a1++→a1=a1+1
*crom→Coef ROM    *a1+=a0→a1=a1+a0

HIGH SPEED DIGITAL SIGNAL PROCESSOR

This application is a Continuation of application Ser. No. 09/144,284 filed Aug. 31, 1998, now U.S. Pat. No. 6,317,770.

BACKGROUND OF THE INVENTION

1. Field of the Invention

This invention relates to a digital signal processor(DSP) for processing various digital signals depending upon any programs.

2. Description of the Prior Art

Nowadays several digital signal processing algorithms are implemented with a hardwired device or a programmable DSP. Such digital signal processing algorithms include complex arithmetic formulas such as fast fourier transform (FFT). For example, "AC-3" suggested as an audio compression and reconstruction algorithm by Dolby Co. Ltd. uses IFFT having a block length of "64" when being intended to improve a resolution of a signal on the time axis; while it uses IFFT having a block length of "128" when being intended to improve a resolution of a signal on the frequency axis. As shown in FIG. 1, such a reverse transform method of the AC-3 algorithm includes a pre-IFFT, a complex IFFT and a post-IFFT that are successively performed after coefficients to be used in the transform are defined. Also, a windowing arithmetic and an overlap and add arithmetic followed by the post-IFFT are sequentially performed. FIG. 2 shows an embodiment of a radix-2 FFT algorithm having a block length of "8". In the radix-2 algorithm, a butterfly structure arithmetic as shown in FIG. 3 is used regularly. The butterfly structure arithmetic as shown in FIG. 3 can be expressed as the following equations:

$$X_{out} = x_{in} + y_{in} \cdot W^*_N$$

$$Y_{out} = x_{in} - y_{in} \cdot W^*_N, \quad (W^*_N = e^{-2\pi k/N})$$

$$Re(X_{out}) = Re(X_{in}) + Re(y_{in})\cos(-2\pi k/N) - Im(y_{in})\sin(-2\pi k/N)$$

$$Im(X_{out}) = Im(X_{in}) + Im(y_{in})\cos(-2\pi k/N) + Re(y_{in})\sin(-2\pi k/N)$$

$$Re(Y_{out}) = Re(X_{in}) - Re(y_{in})\cos(-2\pi k/N) + Im(y_{in})\sin(-2\pi k/N)$$

$$Im(Y_{out}) = Im(X_{in}) - Im(y_{in})\cos(-2\pi k/N) - Re(y_{in})\sin(-2\pi k/N) \quad (1)$$

wherein Re(x) and Im(x) represent a real number part and an imaginary number part, respectively. Also, in the radix-2 algorithm of FIG. 2, butterfly arithmetical groups are multiplexed. The butterfly arithmetical group is obtained by multiplexing the butterfly structure arithmetics, as shown FIG. 4. Further, the radix-2 algorithm with the multiplexed butterfly arithmetical groups is provided to the FFT, as a butterfly arithmetical stage. Accordingly, the FFT consists of the plurality of the butterfly arithmetical stages. In order to operate the FFT, conventional DSPs repeatedly perform steps as shown in the flowchart of FIG. 5.

In order to perform all the operations which are from the simple four arithmetical operations to the FFT including the butterfly structure operation, in the DSP, how fast can each command word be processed is regarded as an important factor. In other words, a period of the command word in the DSP must be shortened and command words as much as possible must be processed in parallel so as to perform a high speed process of the command word. The command word parallel processing capability has required from the time when the DSP was used for the video/audio decoder, and which can be attained by carrying out a plurality of commands in parallel differently from the previous sequential command execution. Accordingly, the recent DSPs has been provided with special command words permitting the parallel process. For example, the ADSP in ADSP21020 model of Analog Device Co. has special command words that allow a number of complex arithmetic equations to be processed within only several clock periods like the butterfly operation for the FFT arithmetic. To this end, the ADS21020 is provided with a register file consisting of at least 12 registers related to the operation. Further, the DSP in ZR38000 model of Zoran Co. can process a number of complex arithmetic equations within several clock periods. To this end, the ZR38000 has a register file consisting of 8 registers and a structure which is capable of performing a multiplication and a resultant addition and subtraction at a time within one clock period.

SUMMARY OF THE INVENTION

Accordingly, it is an object of the present invention to provide a digital signal processor and a digital signal processing method that are capable of rapidly operating a number of complex arithmetic formulae as such FFT.

Further object of the present invention is to provide a fast fourier transform control method that is adaptable for rapidly performing a fast fourier transform procedure.

In order to achieve these and other objects of the invention, a digital signal processing method according to an aspect of the present invention comprises steps of: operating data from first input line and data from second input line by means of first operating means; operating data from any one of the first and second input lines and data from the first operating means by means of second operating means; and operating the data from any one of the first and second input lines and the data from the first operating means by means of third operating means.

A digital signal processing method according to another aspect of the present invention comprises steps of: operating data from first input line and data from second input line by means of first operating means; operating data from the first operating means and data from any one of first feedback line and the first and second input lines by means of second operating means, the first feedback line be connected to first register for storing the data from the second operating means; and operating data from the first operating means and data from any one of second feedback line and the first and second input lines by means of third operating means, the second feedback line being connected to the register for storing the data from the third operating means.

A digital signal processing method according to still another aspect of the present invention comprises steps of: operating data from first input line and data from second input line by means of first operating means; operating data from the first operating means and data from any one of first and second feedback line and the first and second input lines by means of second operating means; and operating data from the first operating means and data from any one of the first and second feedback line and the first and second input lines by means of third operating means, the first feedback line being connected to first register for storing the data from the second operating means, the second feedback line being connected to second register for storing the data from the third operating means.

A digital signal processor according to still another aspect of the present invention includes: first and second input means for receiving N-bit data, respectively; first operating means for operating the data from the first input means and the data from the second input means; second operating means for operating the data from any one of the first and second input means and data from the first operating means; and third operating means for operating the data from any one of the first and second input means and the data from the first operating means.

A digital signal processor according to still another aspect of the present invention includes: first and second input means for receiving N-bit data, respectively; first operating means for operating the data from the first input means and the data from the second input means; second operating means for operating data from the first operating means and data from any one of first feedback line and the first and second input means; third operating means for operating the data from the first operating means and data from any one of second feedback line and the first and second input means; first register being connected to the first feedback line for temporarily storing the data from the second operating means; and second register being connected to the second feedback line for temporarily storing the data from the third operating means.

A digital signal processor according to still another aspect of the present invention includes: first and second input means for receiving N-bit data, respectively; first operating means for operating the data from the first input means and the data from the second input means; second operating means for operating data from the first operating means and data from any one of first and second feedback lines and the first and second input means; third operating means for operating the data from the first operating means and data from any one of the first and second feedback lines and the first and second input means; first register being connected to the first feedback line for temporarily storing the data from the second operating means; and second register being connected to the second feedback line for temporarily storing the data from the third operating means.

A digital signal processor according to still another aspect of the present invention includes: first and second input means for receiving N-bit data, respectively; first operating means for operating the data from the first input means and the data from the second input means; scaling means for scaling up the data from the first and second input means and the first operating means; second operating means for operating data from the first operating means and the data from any one of the scaling means and the first and second input means; and third operating means for operating the data from the first operating means and the data from any one of the scaling means and the first and second input means.

A digital signal processor according to still another aspect of the present invention includes: first and second input means for receiving N-bit data, respectively; first operating means for operating the data from the first input means and the data from the second input means; second operating means for operating data from the first operating means and data from any one of first feedback line and the first and second input means; third operating means for operating the data from the first operating means and data from any one of second feedback line and the first and second input means; scaling means for scaling up the data from any one of the first and second feedback line and the first and second input means; first register being connected to the first feedback line for temporarily storing the data from the second operating means and the scaling means; and second register being connected to the second feedback line for temporarily storing the data from the third operating means and the scaling means.

A digital signal processor according to still another aspect of the present invention includes: first and second input means for receiving N-bit data, respectively; first operating means for operating the data from the first input means and the data from the second input means; second operating means for operating data from the first operating means and data from any one of first and second feedback lines and the first and second input means; third operating means for operating the data from the first operating means and data from any one of the first and second feedback lines and the first and second input means; scaling means for scaling up the data from any one of the first and second feedback line and the first and second input means; first register being connected to the first feedback line for temporarily storing the data from the second operating means and the scaling means; and second register being connected to the second feedback line for temporarily storing the data from the third operating means and the scaling means.

A fast fourier transform control method according to still another aspect of the present invention comprises steps of: identifying value of phase angle included in complex arithmetic equation of the fast fourier transform; selecting any one among at least two procedure control modes on the basis of identified resultant; and performing the fast fourier transform in accordance with selected procedure control mode.

BRIEF DESCRIPTION OF THE DRAWINGS

These and other objects of the invention will be apparent from the following detailed description of the embodiments of the present invention with reference to the accompanying drawings, in which:

FIGS. 8(a)–8(i) show Table 1 to 9 for explaining an operating procedure for a butterfly structure arithmetical.

DETAILED DESCRIPTION OF THE PREFERRED EMBODIMENT

Figure 6:
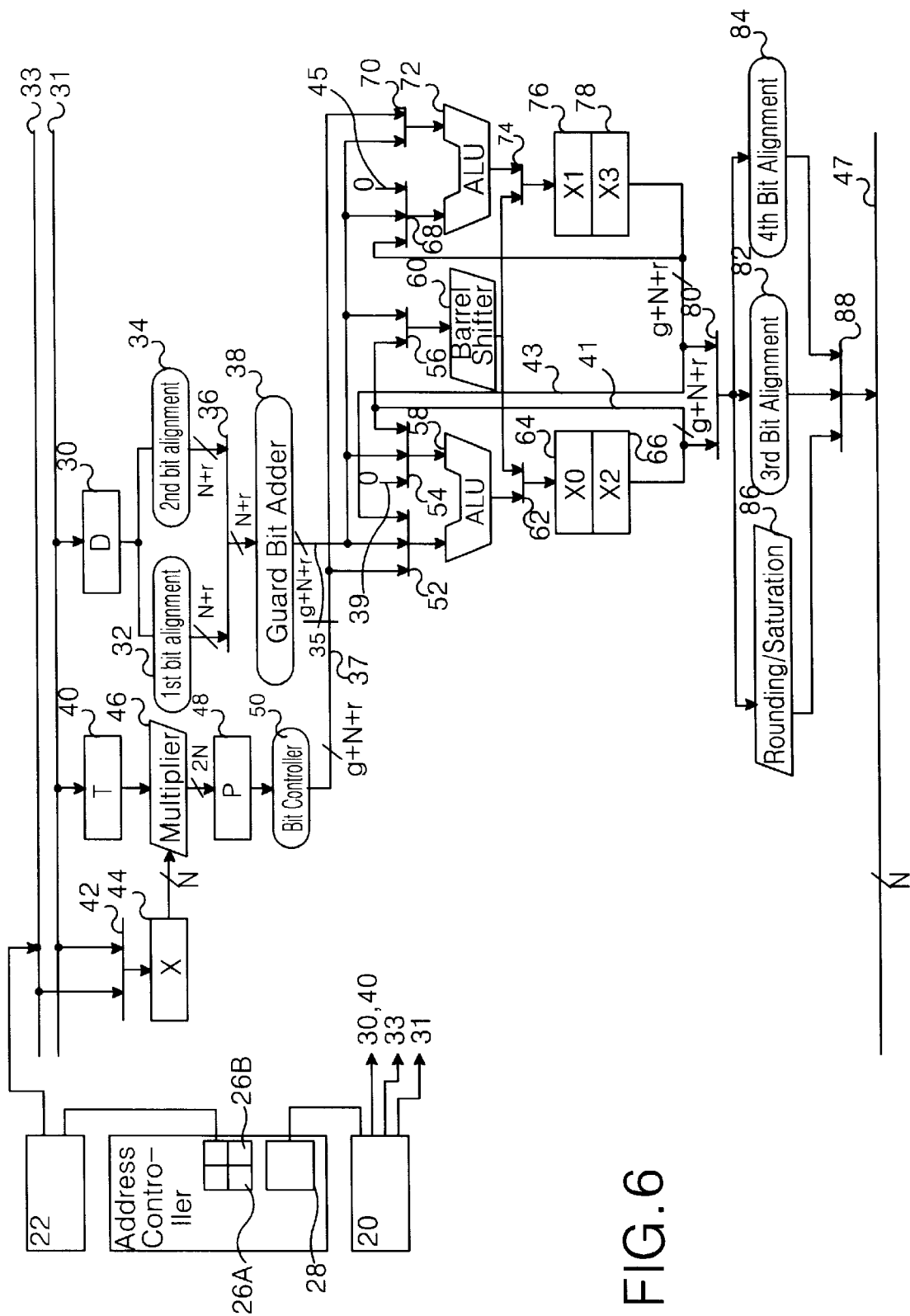
FIG. 6 is a schematic view showing a configuration of a DSP according to an embodiment of the present invention.

Referring to FIG. 6, there is shown a DSP according to an embodiment of the present invention that includes a first register 30 for receiving N bit data from a first external bus 31, and first and second bit alignment units 32 and 34 that are connected, in parallel, to the first register 30. The first external bus 31 is composed of N data lines commonly connected to a working memory 20, and which is used as an N bit first read-only data bus. The first register 30 temporarily stores the N bit data from the memory by way of the first external bus 31. The first and second bit alignment units 32 and 34 align the N bit data from the first register 30 at the left or right of (N+r) bit bus to thereby extend the data from N bit into (N+r) bit. More specifically, the first bit alignment unit 32 has a wiring that connects n bit output lines of the first register 30 to high-order N input terminals of a first multiplexor 36. The second bit alignment unit 34 has a wiring that connects the N bit output lines of the first register 30 to low-order N input terminals of the second input port consisting of (N+r) bit terminals of the first multiplexor 36. At this time, the high-order r bits are occupied with sign bits (positive(+) of negative (−) bits), or a value of "0" in accordance with a sign-extension mode of the DSP. The first multiplexor 36 supplies (N+r) bit data at the first input port or (N+r) bit data at the second input port to a guard bit adder 38 in accordance with a type of operation, that is, the fixed-point/integer arithmetic. The guard bit adder 38 adds the (N+r) bit data from the first multiplexor 36 to guard bits of g bit. All the g bit of guard bits are set to '0' or extends a sign of data. More specifically, all the g bit of guard bits have a logical value equal to the sign bit of (N+r) bit data when the sign-extension mode is set, and have a logical value of '0' when the sign-extension mode is reset. The sign-extension mode is set or reset under a specific command word. In order to add the g-bit guard bits to the (N+r) bit data, the first guard bit adder 38 has a wiring that connects the output port of the first multiplexor 36 consisting of (N−r) terminals to low-order (N+r) lines in (g+N+r) lines included in a first internal bus 35.

The DSP further includes a second register 40 and a multiplier 46 that are connected, in series, to the first external bus 31, and a second multiplexor 42 connected to the first and second external buses 31 and 33. The second register 40 is responsible for temporarily storing the N bit data from the memory received via the first external bus 31 like the first register 30. The second external bus 33 is composed of N lines commonly connected to a programmable memory 22 and the working memory 20 and used as the second read-only data bus. The programmable Memory 22 is connected to a coefficient address register 26 included in an address controller 24. The programmable Memory 22 provides coefficients as such a sine and cosine values and so on to the second external bus 33 responding to the coefficient address signal. The coefficient register 26 consists of a real number address register 26A for generating a real number address signal and an imaginary number address register 26B for generating an imaginary number address signal. The real number address signal indicates areas of the programmable memory 22 which real number coefficients are stored. Likely, the imaginary number address signal indicates areas of the programmable memory 22 which imaginary coefficients are stored. Meanwhile, the working memory 20 applies data stored therein to the first external bus 31 responding to a data address signal from the data address register 28 of the address controller 24. The second multiplexor 42 supplies to a third register 44 any one of the N bit data from the first external bus 31 supplied to its first input port and the N bit data from the second external bus 33 supplied to its second input port. The third register 44 temporarily stores the N bit data from the second multiplexor 42. The multiplier 46 multiplies two data stored in the second and third registers 40 and 44. The result multiplied by the multiplier 46 may have 2N bit. Accordingly, a fourth register 48 for temporarily storing the data from the multiplier 46 must have a length of 2N bit. A bit alignment/guard bit adder 50 connected between the fourth register 48 and a second internal bus 37 converts the 2N bit data stored in the fourth register 48 into (N+r) bit data (wherein 2N>N+r) and adds g-bit guard bits to the converted (N+r) bit data.

The DSP further includes third to fifth multiplexors 52 to 56 commonly connected to the first internal bus 35. The third multiplexor 52 has first to third input ports for receiving (g+N+r) bit data from the first, second and fourth internal buses 35, 37 and 43, respectively. The third multiplexor 52 supplies any one of three data from the first, second and fourth internal buses 35, 37 and 43 to a first ALU 58. The fourth multiplexor 54 includes a first input port 39 for receiving a logical value of '0', and second and third input ports for receiving the (g+N+r) bit data from the first and third internal buses 35 and 41. The first ALU 58 operates two data from the third and fourth multiplexors 52 and 54 and supplies the operated result to a sixth multiplexor 62. The fifth multiplexor 56 also supplies the (g+N+r) bit data from the first internal bus 35 and the (g+N+r) bit data from the third internal bus 41 to a barrel shifter 60 selectively. The barrel shifter 60 scales a logical value of the data from the fifth multiplexor 56 and supplies the scaled data to the sixth multiplexor 62. For such a data scaling, the barrel shifter 60 shifts the data from the fifth multiplexer 56, by the bit number corresponding to a scaling amount, to the left or the right. Also, the barrel shifter 60 is connected, in parallel, to the first ALU 58 to minimize a propagation delay time of data. Accordingly, the DSP can perform the four arithmetical operations, the scaling, the four arithmetical operations including the scaling at a high speed. The sixth multiplexor 62 selectively supplies the four-arithmetical operated data of the (g+N+r) bit from the first ALU 58 and the scaled data from the barrel shifter 60 to a fifth or sixth register 64 or 66. The data stored in the fifth or sixth register 64 or 66 is supplied to the third internal bus 41. The fifth and sixth registers 64 and 66 are accumulating registers, which configures a first accumulator along with the first ALU 58. The fifth and sixth registers 64 and 66 have a length of (g+N+r) bit so as to temporarily store the (g+N+r) bit data, the third internal bus 41 also consists of (g+N+r) lines.

The DSP further includes a seventh multiplexor 68 connected to the first and fourth internal buses 35 and 43, and an eighth multiplexor 70 connected to the first and second internal buses 35 and 37. The seventh multiplexor 68 includes a first input port 45 for receiving a logical value of '0', and second and third input ports for receiving the (g+N+r) bit data from the first and fourth internal buses 35 and 43, respectively. The seventh multiplexor 68 supplies any one of three data at its first to third input ports to a second ALU 72. The eighth multiplexor 70 has first and second input ports for receiving the (g+N+r) bit data from the first and second internal buses 35 and 37, respectively. The eighth multiplexor 70 supplies any one of two data from the first and second internal buses 35 and 37 to the second ALU 72. The second ALU 72 operates two data from the seventh and eighth multiplexors 68 and 70 and supplies the operated result to a ninth multiplexor 74. The ninth multiplexor 74 selectively supplies the operated data of (g+N+r) bit from the second ALU 72 and the scaled data from the barrel shifter 60 to the seventh or eighth register 76 or 78. The seventh or eighth register 76 or 78 supplies the data from the ninth multiplexor 74 to the fourth internal bus 43. The seventh or eighth register 76 or 78 is an accumulating register, which constitutes a second accumulator along with the second ALU 72. The second accumulator is connected, in parallel, to the first accumulator to make a parallel operation of a number of complex arithmetic equations. Each of the seventh and eighth registers 76 and 78 has a length of (g+N+r) bit so as to temporarily store the (g+N+r) bit data. Also, the seventh and eighth registers 76 and 78 allow a number of complex arithmetic equations to be operated at a high speed along with the fifth and sixth registers 64 and 66.

Furthermore, the DSP includes a tenth multiplexor 80 for selecting two (g+N+r) bit data from the third and fourth internal buses 41 and 43, and third and fourth bit alignment units 82 and 84 commonly connected to the tenth multiplexor 80, and a rounding/saturation processor 82. The tenth multiplexor 80 commonly supplies to the third and fourth bit alignment units 82 and 84 and the rounding/saturation processor 86 any one of the (g+N+r) bit data, via the third internal bus 41, from the fifth or sixth register 64 or 66 and the (g+N+r) bit data, via the fourth internal bus 43, from the seventh or eighth register 76 or 78. The third and fourth bit alignment units 82 and 84 derive only N bits from the (g+N+r) bit data from the tenth multiplexor 80 and supplies the derived N bit data to the first and second input ports of the eleventh multiplexor 88. More specifically, the third bit alignment unit 82 derives only high-order (g+1)th bit to low-order N bit data in the (g+N+r) bit data from the tenth multiplexor 80 and supplies the derived N bit data to the first input port of the eleventh multiplexor 88. To this end, the third bit alignment unit 82 includes a wiring that connects N terminals from the high-order (g+1)th terminal, that is, the remaining N terminals except for the high-order g terminals and the low-order r terminals, in the (g+N+r) output terminals of the tenth multiplexor 80 to the first input port of the eleventh multiplexor 88 consisting of N terminals. The third bit alignment unit 82 converts the (g+N+r) bit data into N bit data only by means of the wiring. The fourth bit alignment unit 84 derives only low-order N bit data in the (g+N+r) bit data from the tenth multiplexor 80 and supplies the derived N bit data to the second input port of the eleventh multiplexor 88. To this end, the fourth bit alignment unit 84 includes a wiring that connects the low-order N terminals, that is, the remaining N terminals except for the high-order (g+r) terminals, in the (g+N+r) output terminals of the tenth multiplexor 80 to the second input port of the eleventh multiplexor 88 consisting of N terminals. The fourth bit alignment unit 84 does not require a separate circuit block because it is configured with only the wiring along with the first to third bit alignment units 32, 34 and 82. Accordingly, the first to fourth bit alignment units 32, 34, 82 and 84 are capable of simplifying the circuit configuration of DSP as well as performing the fixed-point and integer arithmetics in a high speed.

The rounding/saturation processor 86 is driven in a rounding process mode, a saturation process mode or a combined mode under a command from a controller(not shown). In the rounding mode, the rounding/saturation processor 86 checks a logical value of "r"th bit in the (g+N+r) bit data from the tenth multiplexor 80. If the logical value of low-order "r"th bit is 1, the rounding/saturation processor 86 eliminates low-order r bits from the (g+N+r) data to generate a (g+N) bit data. The (g+N) bit data is added to 1 by means of the rounding/saturation processor 86. The g bits are removed from the added (g+N) bit data to generate N bit data. The rounding/saturation processor 86 applies the N bit data to the eleventh multiplexor 88. Subsequently, in the saturation mode, the rounding/saturation processor 86 processes the data in accordance with a logical value of the high-order (g+1) bits from the (g+N+r) bit data from the tenth multiplexor 80. More specifically, the rounding/saturation processor 86 determines the generation of overflow in accordance with whether or not all logical values of the high-order (g+1) bits(i.e., g guard bits and one sign bit) in the (g+N+r) bit data from the tenth multiplexor 80 are same. If so, the rounding/saturation processor 86 supplies the remaining N bit data except for the high-order g bit and the low-order r bit in the (g+N+r) bit data from the tenth multiplexor 80 to the third input port of the eleventh multiplexor 88 as the operated result. Otherwise, if not, the rounding/saturation processor 86 determines whether a logical value of most significant bit of g guard bits is '0' or '1'. If a logical value of the most significant bit is '0', then the rounding/saturation processor 86 considers the data from the tenth multiplexor 80 to be a positive(+) data provided with an overflow and supplies a maximum value of N bit data(i.e., "0111 ... 11"), in which only the most significant bit has a logical value of '0', to the third input port of the eleventh multiplexor 88. Otherwise, if a logical value of the most significant bit is '1', the rounding/saturation processor 86 considers the data from the tenth multiplexor 80 to be a negative(−) data provided with an overflow and supplies N bit data(i.e., "1000 ... 00"), in which only the most significant bit has a logical value of '1', to the third input port of the eleventh multiplexor 88. As described above, the saturation processor 86 accurately process a saturated logical value(i.e., a logical value generating an overflow) of the data operated by means of the ALU 58 or 72 based on logical values of guard bits and a sign bit. In the combination mode, the rounding/saturation processor 86 performs the rounding process for the (g+N+r) bit data from the tenth multiplexor 80 and then performs the saturation process for the rounded (g+N) bit data. The N bit data rounded and saturated using the rounding/saturation processor 86 in the above manner is applied to the eleventh multiplexor 88. In this case, the rounding/saturation processor 86 first performs the rounding process for the low-order bits, but performs the rounding and saturation process within one clock period, so that it does not waste an additional rounding process time. Accordingly, the rounding/saturation processor 86 provides an advantage in that it can round the fixed-point operated data without wasting an additional clock. The eleventh multiplexor 88 transfers any one of three N bit data form the third and fourth bit alignment units 82 and 84 and the rounding/saturation processor 86 to the third external bus 47. The third external bus 47 consists of N lines including a write-only data bus and a write-only address bus.

Figure 7:
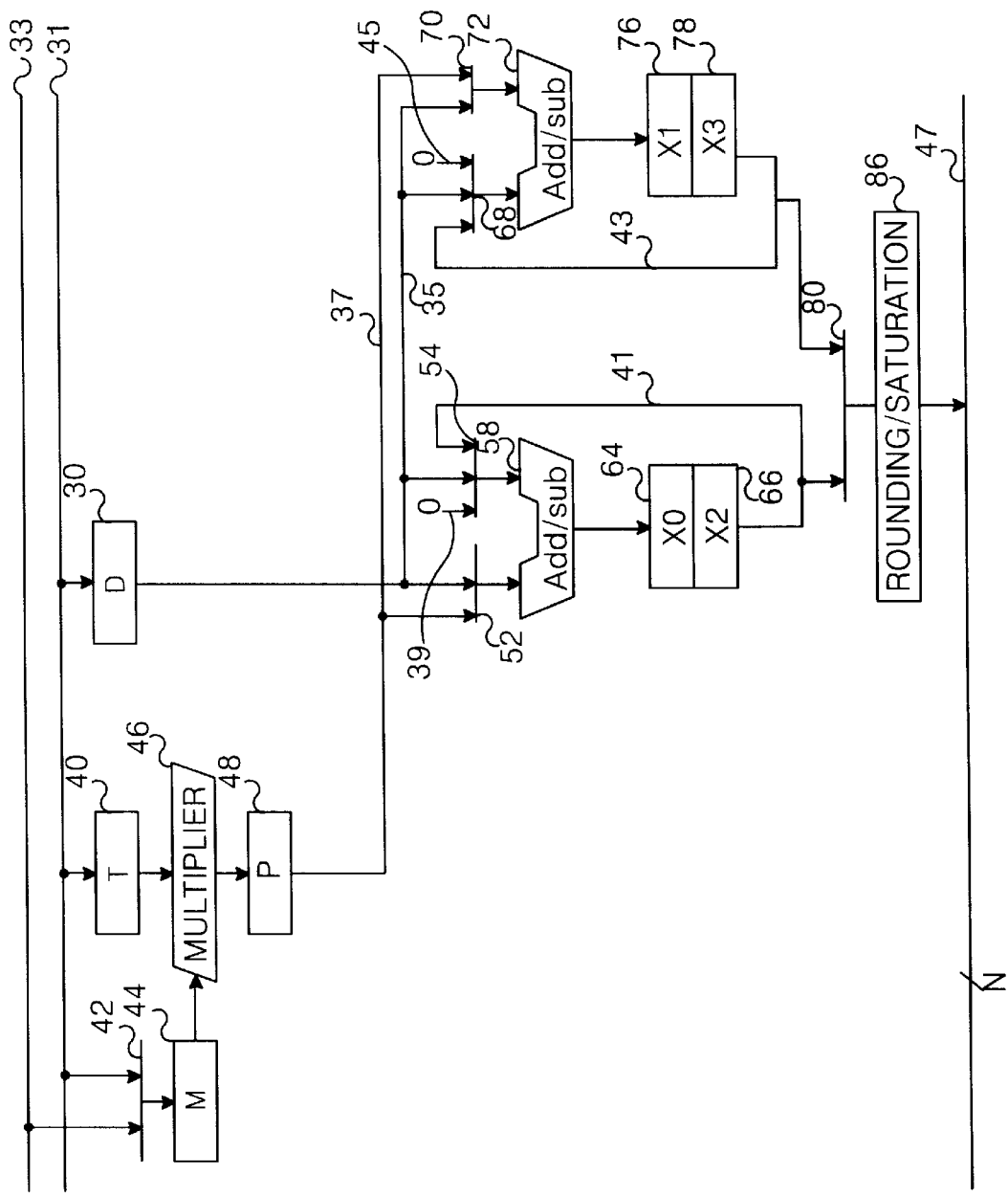
FIG. 7 is a view for showing the part of performing, in parallel, a number of complex arithmetical equations in FIG. 6.

FIG. 7 shows a circuit configuration for performing the operations for at least two complex arithmetical equations in parallel. In FIG. 7, the first accumulator consisting of the first ALU(58) and the fifth and sixth registers 64 and 66 is connected in parallel with a second accumulator including the second ALU(72) and the seventh and eighth registers 76 and 78 so that at least two complex arithmetical equations are operated in parallel. Table 1 explains the procedure in which four complex equations are operated in parallel. Referring to table 1, the four complex equations as follows, equations 2 to 5, are operated in parallel, thereby allowing their operations to complete within the period corresponding to 9 clocks.

$$x'(a)=x(a)+\cos \theta_q \cdot x(b)-\sin \theta_q \cdot y(b) \quad (2)$$

$$y'(a)=y(a)+\sin \theta_q \cdot x(b)+\cos \theta_q \cdot y(b) \quad (3)$$

$$x'(b)=x(a)-\cos \theta_q \cdot x(b)+\sin \theta_q \cdot y(b) \quad (4)$$

$$y'(b)=y(a)-\sin \theta_q \cdot x(b)-\cos \theta_q \cdot y(b) \quad (5)$$

In the table 1, D, T, M, P, X0, X1, X2 and X3 are data stored respectively in the first through eighth registers 30, 40, 44, 48, 64, 66, 76 and 78. The DSP uses the parallel circuit having a pair of the accumulators and operates two complex arithmetical equations in parallel. Accordingly, the DSP can terminate the operation for a number of the complex arithmetical equations within the periods corresponding to a relative small number of clocks.

Figure 3:
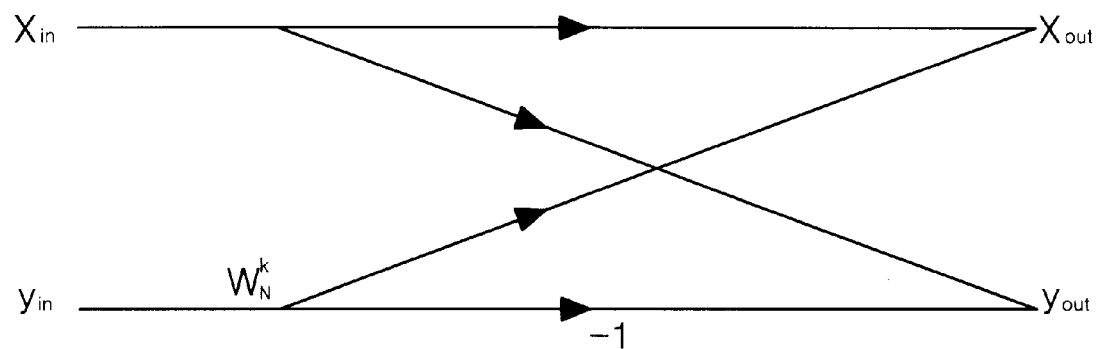
FIG. 3 is a view for explaining a butterfly structure arithmetic.
Figure 4:
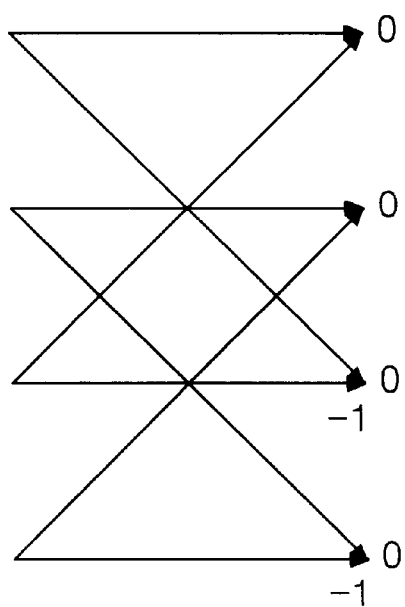
FIG. 4 is a view for explaining a butterfly arithmetical group.
Figure 5:
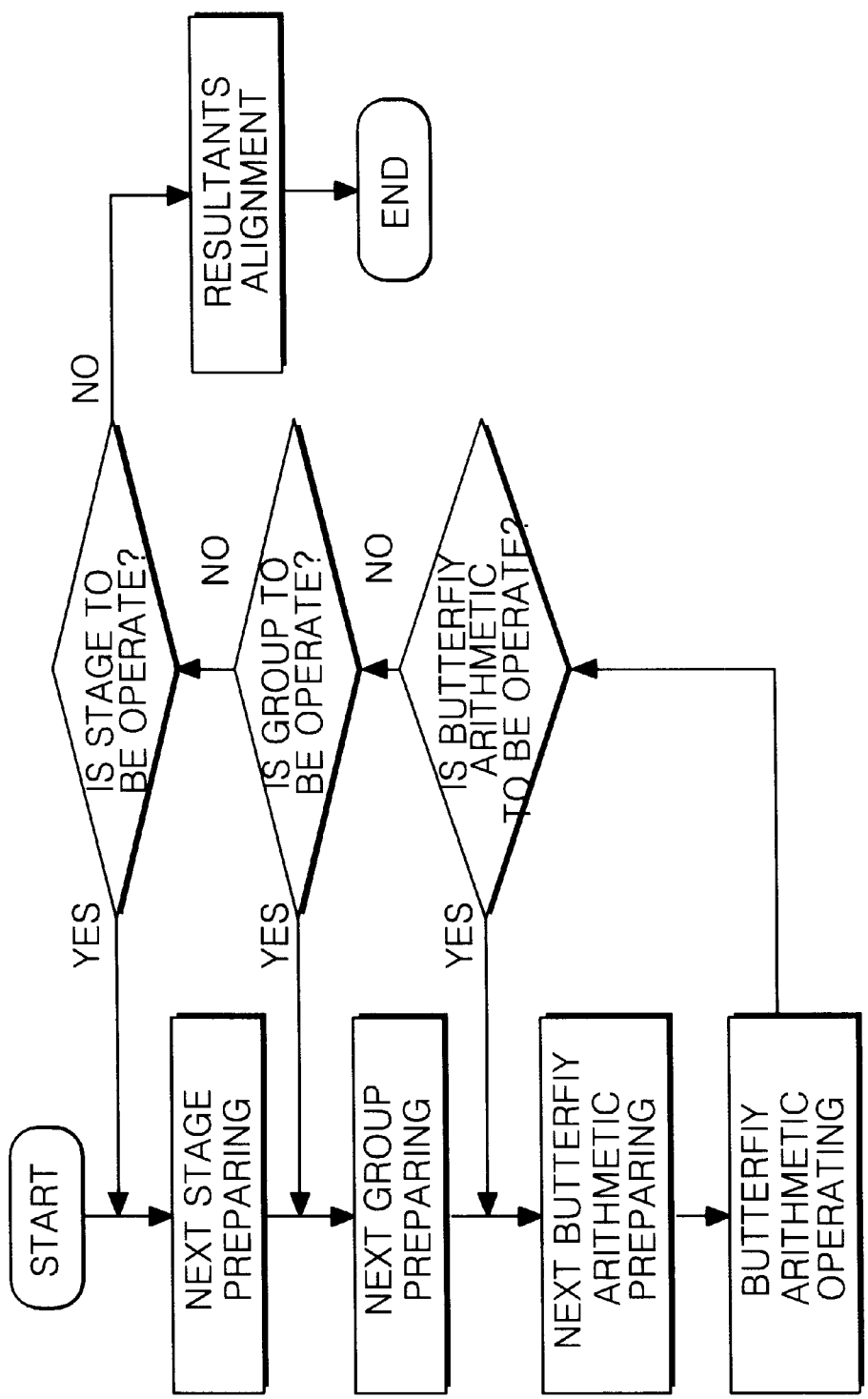
FIG. 5 is a flowchart for performing a FFT.

The procedure of operating the above equations (2) to (5) by the DSP of FIG. 3 will be described at each of the clock periods, as table 1. The working memory 20 applies x(a) to the D register 30 in the first clock period. During the second clock period, the programmable memory 22 applies $\cos\theta_q$ to the M register 44 and the working memory 20 provides x(b) to the T register 40. The multiplier 46 multiplies the x(b) and $\cos\theta_q$ from the T and M registers 40 and 44, and stores the multiplied x(b)·cos $\theta_q$ in the P register 48 during the third clock period. Then, y(b) and sin $\theta_q$ from the working and programmable memories 20 and 22 are stored in the T and M registers 40 and 44, respectively. During the fourth clock period, the x(a) is added by the first ALU(58) to the x(b)·cos $\theta_q$ and allows the added x0=x(a)+x(b)·cos $\theta_q$ to be stored in the accumulating register 64. Also, the second ALU 72 subtracts the x(b)·cos $\theta_q$ from the P register 48 from the x(a) from the D register 30 so that the subtracted x1=x(a)−x(b)·cos $\theta_q$ is stored in the accumulating register 76. Further, the multiplier 46 multiplies the y(b) from the T register 40 by the sin $\theta_q$ from the M register 44 and stores the multiplied y(b)·sin $\theta_q$ in the P register 48. Furthermore, the T and M register 40 and 44 store y(a) from the working memory 20 and cos $\theta_q$ from the programmable memory 22, respectively. During the fifth clock period, the first ALU 58 subtracts the y(b)·sin $\theta_q$ of the P register 48 from the x0 of the accumulating register 64 allows x0=x0−y(b)·sin $\theta_q$ to store in the accumulating register 64. The second ALU 72 adds the x1 of the accumulating register 76 and the y(b)·sin $\theta_q$ of the P register 48 and allows x1=x1+y(b)·sin $\theta_q$ to be stored in the accumulating register 76. Also, the multiplier 46 multiplies the y(b) of the T register 40 by the cos $\theta_q$ of the M register 44 so that y(b)·cos $\theta_q$ is stored in the P register 48. Further, the T and M registers 40 and 44 store x(b) from the working memory 20 and sin $\theta_q$ from the programmable memory 22, respectively. The rounding/saturation processor 86 rounds and/or saturates the x0 from the accumulating register 64 and stores the rounded and/or saturated x0 to the working memory 20 as x'(a), during the sixth clock period. The first ALU 58 subtracts the y(b)·cos $\theta_q$ of the P register 48 from the y(a) of the D register 30 and allows the subtracted x2=y(a)−y(b)·cos $\theta_q$ to store in the accumulating register 66. While, the second ALU 72 adds the y(b)·cos $\theta_q$ of the P register 48 and the y(a) of the D register 30 so that the subtracted x3−y(a)+y(b)·cos $\theta_q$ is stored in the accumulating register 78. Then, the P register 48 stores x(b)·sin $\theta_q$ which the x(b) of the T register 40 and the sin $\theta_q$ of the M register 44 are multiplied by means of the multiplier 46. During the seventh clock period, the rounding/saturation processor 86 rounds and/or saturates the x1 from the accumulating register 76 and stores the rounded and/or saturated x1 to the working memory 20 as y'(a). The first ALU 58 subtracts the x(b)·sin $\theta_q$ of the P register 48 from the x2 of the accumulating register 66 and allows x2=x2−x(b)·sin $\theta_q$ to store in the accumulating register 66. The second ALU 72 adds the x3 of the accumulating register 78 and the x(b)·sin $\theta_q$ of the P register 48 and allows x3=x3+x(b)·sin $\theta_q$ to store in the accumulating register 76. The x2 of the accumulating register 66 is rounded and/or saturated by means of the rounding/saturation processor 86 allowing the rounded and/or saturated x2 as y'(a) to be stored in the working memory 20. Finally, the x3 of the accumulating register 78 is also rounded and/or saturated by means of the rounding/saturation processor 86 allowing the rounded and/or saturated x3 as y'(b) to be stored in the working memory 20. As described above, all of the equations 2 through 5 have operated by means of the DSP within the period corresponding to the 9 clocks.

Table 2 explains an address control procedure for operating the equations 2 through 5. In table 2, a1 through a4 as address signals are provided for the operating resultants x'(a), x'(b), y'(a) and y'(b) of the equations 2 to 5 in which are generated at each of the sixth through ninth clock periods. If the resultants are set as the original data (i.e. dram(a)=x(a), x(b), y(a) and y(b)) stored in the working memory 20, the address signals a1 through a4 is generated by one clock period before the resultants x'(a), x'(b), y'(a) and y'(b) are obtained. Accordingly, the data address register 28 increases the original address signals a1 through a4 by "1" at each the fifth to eighth clock periods, i.e. a1=a1+1, a2=a2+1, a3=a3+1 and a4=a4+1, to generate new data address signals a1 to a4. Also, the cos address signal cosptr from the cos address register 26A and the sin address signal sinptr from the sin address register 26B are applied to the programmable memory 22 to be stored the data read-out from the programmable memory 22 to the M register 44. Further, the dram(a1) to dram(a4) are supplied to the working memory 20 and allows the data read-out from the working memory 20 to be stored in the T register 40.

Table 3 explains a control procedure in the case of performing the FFT that includes two butterfly structure arithmetics. In table 3, the fifth to ninth clock periods are repeated. In order to perform the FFT that the butterfly structure arithmetical operations are formed to repeat N times, the clock periods are consumed by 5N+4. For example, 14 clock periods are required for the FFT which the butterfly structure arithmetical operation is repeated two times. In the FFT that the butterfly arithmetical operation is repeated at least two times, the coefficient address register 26 increases the coefficient address signal sinptr or cosptr by 1 in which each butterfly arithmetical operation is completed, because of varying the value of "$\theta_q$" in accordance with the butterfly arithmetical operations. Also, the data address signals a1 through a4 generated in the data address register 28 is increased larger than 1, i.e. by a0, in which each of the butterfly arithmetical operations is completed.

Furthermore, in the case the phase angle $\theta_q$ has a value of "0" or "π/2", the equations 2 to 5 are simple because values of the sin $\theta_q$ and cos $\theta_q$ have respectively to "0" or "1". For example, if the phase angle is "0", the values of the sin $\theta_q$ and cos $\theta_q$ have respectively "0" and "1". Accordingly, the equations 2 to 5 can be represented as equations 6 to 9.

$$x'(a) = x(a) + x(b) \tag{6}$$

$$y'(a) = y(a) + x(b) \tag{7}$$

$$x'(b) = x(a) - x(b) \tag{8}$$

$$y'(b) = y(a) - y(b) \tag{9}$$

Those equations 6 to 9 are operated according to the procedure shown in table 4. The procedure of operating the equations 6 to 9 is performed for the period corresponding to 7 clock cycles. Table 5 illustrates an address control process for performing the procedure as table 4. Table 6 explains another address control process in which the butterfly arithmetic including the equations 6 through 9 is repeated one more. In table 6, the procedure of operating the repeated butterfly arithmetics is terminated within the period corresponding to 11 clock cycles. Also, two butterfly arithmetics are operated in parallel during 4 clock cycles, i.e. for the period corresponding to the fourth through eleventh clock cycles, as illustrated in table 6. Further, in the case the butterfly arithmetic is repeated three times, two butterfly arithmetics are operated, in parallel, even during the period of the tenth through thirteenth clock cycles.

Meanwhile, if the phase angle is "π/2", the values of the sin $\theta_q$ and cos $\theta_q$ have respectively "1" and "0".

Accordingly, the equations 2 to 5 can be represented as equations 10 to 13.

$$x'(a)=x(a)-x(b) \quad (10)$$

$$y'(a)=y(a)+y(b) \quad (11)$$

$$x'(b)=x(a)+x(b) \quad (12)$$

$$y'(b)=y(a)-y(b) \quad (13)$$

Those equations 10 to 13 are operated according to the procedure shown in table 7. The procedure of operating the equations 10 to 13 is performed for the period corresponding to 7 clock cycles. Table 8 illustrates an address control process for performing the procedure as table 7. Table 9 explains another address control process that the butterfly arithmetic including the equations 6 through 9 is repeated one more. In table 9, the procedure of operating the repeated butterfly arithmetics is terminated within the period corresponding to clock cycles. Also, two butterfly arithmetics are operated in parallel during 4 clock cycles, i.e. for the period corresponding to the fourth through eleventh clock cycles, as illustrated in table 9. Further, in the case the butterfly arithmetic is repeated three times, two butterfly arithmetics are operated, in parallel, even during the period of the tenth through thirteenth clock cycles.

Figure 1:
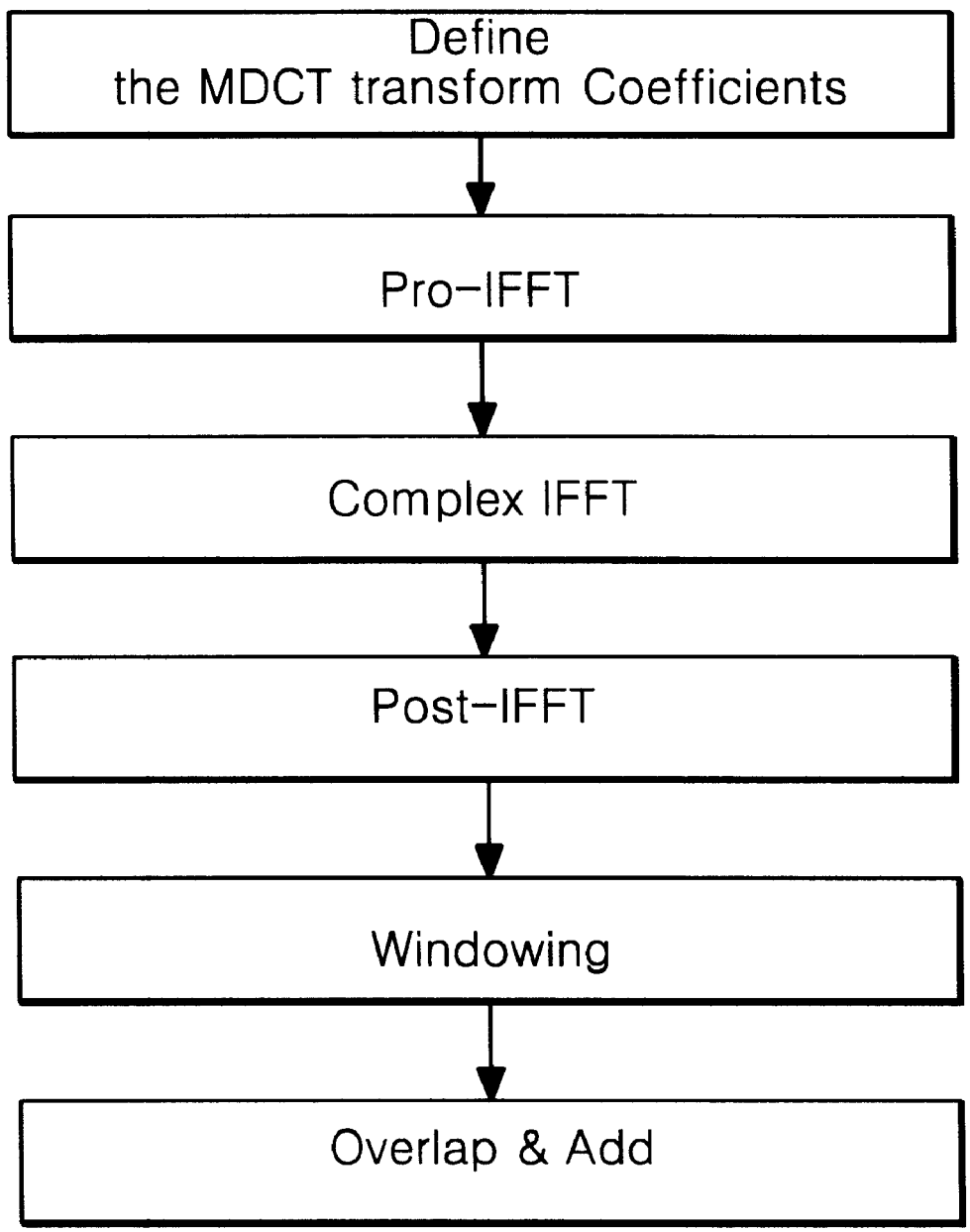
FIG. 1 is a view for explaining an inverse transform procedure of AC-3 decoding.
Figure 2:
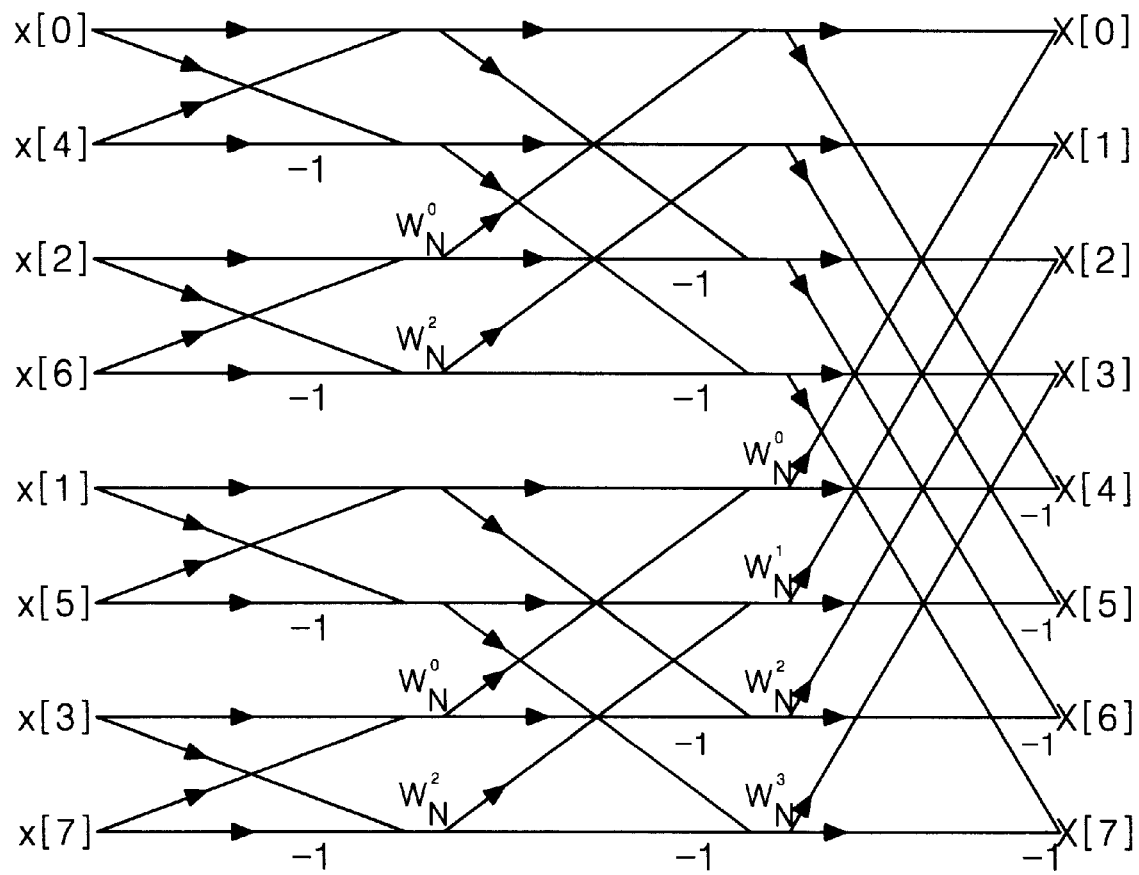
FIG. 2 is a view for explaining an 8 point radix-2 FFT structure.

In the butterfly structure arithmetic including "0" or "π/2"of the phase angle $\theta_q$, the additional operation procedure as such tables 6 through 11 is adapted to the DSPs as shown in FIGS. 6 and 7. Accordingly, the butterfly structure arithmetic is rapidly operated by the DSPs as shown in FIGS. 6 and 7. Also, the DSPs of FIGS. 6 and 7 perform rapidly the radix-2 arithmetic shown in FIG. 2, multiplexed by the butterfly structure arithmetics, and the FFT consisting of the plurality of the radix-2 arithmetics.

As described above, the DSP according to the present invention makes a parallel operation of a plurality of complex arithmetical equations using a pair of ALUs connected in parallel, thereby operating a number of complex arithmetical equations at a high speed. Also, the DSP according to the present invention performs rapidly the radix-2 arithmetic multiplexed by the butterfly structure arithmetics and the FFT consisting of the plurality of the radix-2 arithmetics.

Further, the DSP according to the present invention controls the number of data bits (i.e., the wordlength) supplied to the ALU with the aid of the wiring and allows the number of rounding bits (i.e., r) to be smaller than N, so that it can shorten the length of the ALU and the accumulating register. Also, in the DSP according to the present invention, the rounding of data is simultaneously performed at the time of the saturation process of data to thereby eliminate a time required for the rounding process of data. Accordingly, the DSP according to the present invention can process a signal at a high speed.

Furthermore, in the DSP according to the present invention, the bit alignment units implemented with the wiring are arranged at the pre-stage or the post-stage of the accumulator, thereby performing the fixed-point and integer arithmetics in a high speed as well as simplifying the circuit configuration.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A digital signal processing method, comprising:

performing a first prescribed operation based on data from a first input line and data from a second input line by means of first operating means;

performing a second prescribed operation based on data from the first operating means, data received from any one of first and second feedback lines and the data from the first and second input lines by means of second operating means; and performing the second prescribed operation based on data from the first operating means, data received from any one of the second feedback line and the data from the first and second input lines by means of third operating means, the first feedback line being connected to a first register for storing the data from the second operating means, the second feedback line being connected to a second register for storing the data from the third operating means, wherein the first prescribed operation is multiplication and the first operating means consists of a single multiplier.

2. The method of claim 1, wherein two instances of a complex arithmetic equation can be concurrently performed by the digital signal processing method using only the three arithmetic operating means.

3. The method of claim 1, wherein the second prescribed operation is one of adding and subtracting.

4. The digital signal processing method of claim 1, comprising:

scaling the data from any one of the first feedback line, and the data input via the single multiplier and the first and second input lines, wherein the scaling outputs scaled data to the first and second registers.

5. A digital signal processor, comprising:

first and second input means for receiving N-bit data, respectively;

a single multiplier for performing multiplication based on the data from the first input means and the data from the second input means;

first operating means for performing a prescribed operation based on data from the single multiplier, data received from any one of first and second feedback lines and the data from the first and second input means;

second operating means for performing the prescribed operation based on the data from the single multiplier, data input from any one of the second feedback line and the data from the first and second input means;

first register being connected to the first feedback line for temporarily storing the data from the first operating means; and second register being connected to the second feedback line for temporarily storing the data from the second operating means.

6. The digital signal processor of claim 5, comprising:

a third register connected between the first and second input lines and the single multiplier;

a fourth register connected between the first input line and the single multiplier;

a fifth register connected between the single multiplier and the first and second operating means; and a sixth register connected between the first input line and the first operating means and the second operating means.

7. The digital signal processor of claim 5, comprising:
a scaler that scales the data from any one of the first feedback line, and the data output by the single multiplier and input via the first and second input lines, wherein the scaler has an output connected to the first and second registers.

8. The digital signal processor of claim 5, wherein the single multiplier, the first operating means and the second operating means are coupled to receive data from the first and second input means that is not a result of an arithmetic operation, and wherein the digital signal processor consists of the single multiplier.

9. A digital signal processor, comprising:
first and second input means for receiving N-bit data, respectively;
first operating means for performing a first prescribed operation based on the data input via the first input means and the second input means;
second operating means for performing a second prescribed operation based on data input via the first operating means and data from any one of first feedback line and the data input via the first and second input means;
third operating means for performing the second prescribed operation based on the data input via the first operating means and data from any one of second feedback line and the data input via the first and second input means;
scaling means for scaling up the data from any one of the first feedback line and the first and second input means;
a first register being connected between the first feedback line and the second operating means and the scaling means for temporarily storing the data received from the second operating means and the scaling means, respectively; and
a second register being connected between the second feedback line and the third operating means and the scaling means for temporarily storing the data received from the third operating means and the scaling means, respectively, wherein the first, second and third operating means are coupled to the first and second input means.

10. The digital signal processor of claim 9, further comprising a third register coupled between the first operating means and the second and third operating means, for temporarily holding data from the first operating means, wherein the digital signal processor consists of three arithmetic operations, wherein first, second and third arithmetic operators are respectively the first, second and third operating means, wherein the first prescribed operation is multiplication and the first operating means is a single multiplier.

11. The digital signal processor of claim 10, wherein three (3) instances of a complex arithmetic equation can be concurrently performed using only the three arithmetic operators.

12. The digital signal processor of claim 9, comprising:
a third register connected between the first and second input lines and the first operating means;
a fourth register connected between the first input line and the first operating means;
a fifth register connected between the first operating means and the second and third operating means; and
a sixth register connected between the first input line and the second operating means, the third operating means and the scaling means.

13. A digital signal processor, comprising:
first and second input lines that receive N-bit data, respectively;
a single multiplier that multiplies the data input via the first input line and the second input line;
a first ALU that performs a first prescribed operation based on data output by the single multiplier, data from a first feedback line and the data input via the first and second input lines;
a second ALU that performs a second prescribed operation based on the data output by the single multiplier, data from a second feedback line and the data input via the first and second input lines;
a first register being connected to the first feedback line that stores the data from the first ALU; and
a second register being connected to the second feedback line that stores the data from the second ALU.

14. The digital signal processor of claim 13, wherein the single multiplier, the first ALU and the second ALU are coupled to receive data that is not a result of an arithmetic operation.

15. The digital signal processor of claim 13, comprising:
a third register connected between the multiplier and the first and second ALUs, wherein the digital signal processor consists of first, second and third arithmetic operators being the single multiplier, the first ALU and the second ALU, respectively.

16. The digital signal processor of claim 15, wherein three (3) instances of a complex arithmetic equation can be concurrently performed without using additional arithmetic operators, and wherein each of the three instances of the complex arithmetic equation is a fast fourier transform as follows:

$$X_{out} = x_{in} + y_{in} \cdot W^*_N$$

$$Y_{out} = x_{in} - y_{in} \cdot W^*_N, \quad (W^*_N = e^{-2\pi k/N})$$

$$Re(X_{out}) = Re(x_{in}) + Re(y_{in})\cos(-2\pi k/N) - Im(y_{in})\sin(-2\pi k/N)$$

$$Im(X_{out}) = Im(x_{in}) + Im(y_{in})\cos(-2\pi k/N) + Re(y_{in})\sin(-2\pi k/N)$$

$$Re(Y_{out}) = Re(x_{in}) - Re(y_{in})\cos(-2\pi k/N) + Im(y_{in})\sin(-2\pi k/N)$$

$$Im(X_{out}) = Im(x_{in}) - Im(y_{in})\cos(-2\pi k/N) - Re(y_{in})\sin(-2\pi k/N)$$

wherein $Re(x)$ and $Im(x)$ represent a real number part and an imaginary number part, respectively.

17. The digital signal processor of claim 16, wherein a first procedure control mode performs the complex arithmetic equation when the phase angle is 0 and 180 degrees and a second procedure control mode performs the complex arithmetic equation otherwise.

18. The digital signal processor of claim 16, wherein the digital signal processor operates in one of at least two modes responsive to a phase angle when the complex arithmetic equation for fast fourier transform is processed.

19. The digital signal processor of claim 16, wherein the single multiplier, the first ALU and the second ALU are coupled to receive data from one of the first and second input lines that is not a result of an arithmetic operation.

20. The digital signal processor of claim 13, comprising:
a third register connected between the multiplier and the first and second ALUs; and
a fourth register connected between the first input line, the first ALU, and the second ALU.

21. The digital signal processor of claim 20, comprising:
a fifth register connected between the first and second input lines and the multiplier; and a sixth register connected between the first input line and the multiplier.

22. The digital signal processor of claim 13, comprising:

a scaler that scales the data from any one of the first feedback line, and the data output by the single multiplier and the data input via the first and second input lines, wherein the scaler has an output connected to the first and second registers.

* * * * *